US012080262B2

(12) United States Patent
Suzuki et al.

(10) Patent No.: US 12,080,262 B2
(45) Date of Patent: Sep. 3, 2024

(54) MUSICAL PIECE ANALYSIS DEVICE, PROGRAM, AND MUSICAL PIECE ANALYSIS METHOD

(71) Applicant: AlphaTheta Corporation, Yokohama (JP)

(72) Inventors: Shiro Suzuki, Yokohama (JP); Toshihisa Sabi, Yokohama (JP)

(73) Assignee: ALPHATHETA CORPORATION, Yokohama (JP)

( * ) Notice: Subject to any disclaimer, the term of this patent is extended or adjusted under 35 U.S.C. 154(b) by 372 days.

(21) Appl. No.: 17/619,412

(22) PCT Filed: Jun. 17, 2019

(86) PCT No.: PCT/JP2019/023929

§ 371 (c)(1),
(2) Date: Dec. 15, 2021

(87) PCT Pub. No.: WO2020/255214

PCT Pub. Date: Dec. 24, 2020

(65) Prior Publication Data

US 2022/0262331 A1 Aug. 18, 2022

(51) Int. Cl.

*G10H 1/057* (2006.01)
*G10H 1/00* (2006.01)
*G10H 1/40* (2006.01)

(52) U.S. Cl.

CPC ......... *G10H 1/0575* (2013.01); *G10H 1/0025* (2013.01); *G10H 1/40* (2013.01); *G10H 2210/081* (2013.01)

(58) Field of Classification Search

CPC ..................................................... G06F 16/683

(Continued)

(56) References Cited

U.S. PATENT DOCUMENTS

2013/0289756 A1* 10/2013 Resch ............... G06F 16/24578 700/94
2014/0366710 A1* 12/2014 Eronen .................... G10H 1/00 84/609

(Continued)

FOREIGN PATENT DOCUMENTS

| | | |
|---|---|---|
| JP | 5-273976 | 10/1993 |
| JP | 2018-25644 | 2/2018 |
| WO | 2010/137074 | 12/2010 |

OTHER PUBLICATIONS

International Search Report dated Jul. 30, 2019, Application No. PCT/JP2019/023929; English translation included, 2 pages.

(Continued)

*Primary Examiner* — Alexander Krzystan

(74) *Attorney, Agent, or Firm* — Rankin, Hill & Clark LLP

(57) ABSTRACT

A music piece analyzer includes: a key candidate determiner configured to analyze music data to determine a plurality of key candidates; and a key selector configured to extract each one of the plurality of key candidates, detect keys corresponding to related keys from among remaining ones of the plurality of key candidates supposing that the extracted one of the plurality of key candidates is a main key, on each extracted one of the plurality of key candidates, calculate a related key score in accordance with the number of the keys corresponding to the related keys, and select a key of a music piece in accordance with the related key score from among the plurality of key candidates.

8 Claims, 4 Drawing Sheets

(58) Field of Classification Search
USPC ........................................................ 700/94
See application file for complete search history.

(56) References Cited

U.S. PATENT DOCUMENTS

2017/0358302 A1* 12/2017 Orr ...................... G06F 16/435
2018/0357991 A1* 12/2018 Barry .................... G10H 1/386

OTHER PUBLICATIONS

International Preliminary Report on Patentability dated Dec. 21, 2021, 5 pages.

* cited by examiner

FIG. 2

| | ROOT | I | II | III | IV | V | VI | VII |
|---|---|---|---|---|---|---|---|---|
| major | A | A | B | D♭ | D | E | G♭ | A♭ |
| major | B♭ | B♭ | C | D | E♭ | F | G | A |
| major | B | B | D♭ | E♭ | E | G♭ | A♭ | B♭ |
| major | C | C | D | E | F | G | A | B |
| major | D♭ | D♭ | E♭ | F | G♭ | A♭ | B♭ | C |
| major | D | D | E | G♭ | G | A | B | D♭ |
| major | E♭ | E♭ | F | G | A♭ | B♭ | C | D |
| major | E | E | G♭ | A♭ | A | B | D♭ | E♭ |
| major | F | F | G | A | B♭ | C | D | E |
| major | G♭ | G♭ | A♭ | B♭ | B | D♭ | E♭ | F |
| major | G | G | A | B | C | D | E | G♭ |
| major | A♭ | A♭ | B♭ | C | D♭ | E♭ | F | G |
| minor | A | A | B | C | D | E | F | G |
| minor | B♭ | B♭ | C | D♭ | E♭ | F | G♭ | A♭ |
| minor | B | B | D♭ | D | E | G♭ | G | A |
| minor | C | C | D | E♭ | F | G | A♭ | B♭ |
| minor | D♭ | D♭ | E♭ | E | G♭ | A♭ | A | B |
| minor | D | D | E | F | G | A | B♭ | C |
| minor | E♭ | E♭ | F | G♭ | A♭ | B♭ | B | D♭ |
| minor | E | E | G♭ | G | A | B | C | D |
| minor | F | F | G | A♭ | B♭ | C | D♭ | E♭ |
| minor | G♭ | G♭ | A♭ | A | B | D♭ | D | E |
| minor | G | G | A | B♭ | C | D | E♭ | F |
| minor | A♭ | A♭ | B♭ | B | D♭ | E♭ | E | G♭ |

MUSICAL PIECE ANALYSIS DEVICE, PROGRAM, AND MUSICAL PIECE ANALYSIS METHOD

TECHNICAL FIELD

The present invention relates to a music piece analyzer, a program and a music piece analysis method.

BACKGROUND ART

There has been proposed a technique for automatically specifying a key of a music piece. For instance, Patent Literature 1 discloses a music piece key estimation device including: an audio data acquisition unit for acquiring audio data of a music piece; a storage for storing key information indicating a relationship between a key and notes of a scale; and a key estimator for analyzing frequency of the audio data of a predetermined section to calculate a chroma vector, selecting a plurality of scales from among the scales included in the chroma vector, determining key candidates based on combinations of the selected plurality of scales and key information, and specifying the key of the music piece from among the determined key candidates.

CITATION LIST

Patent Literature(s)

Patent Literature 1: JP 2018-025644 A

SUMMARY OF THE INVENTION

Problem(s) to be Solved by the Invention

In the above-described Patent Literature 1, the key of the music piece is specified from among the key candidates based on a distance between the scales of the key candidates, strength of notes included in each of the key candidates, and strength of a note of the scale preceding a note representing each of the key candidates. However, this method sometimes fails to highly accurately and appropriately estimate a key of a music piece.

An object of the invention is to provide a music piece analyzer, a program, and a music piece analysis method capable of more highly accurately and appropriately estimating a key of a music piece.

Means for Solving the Problem(s)

According to an aspect of the invention, there is provided a music piece analyzer including: a key candidate determiner configured to analyze music data to determine a plurality of key candidates; and a key selector configured to: extract each one of the plurality of key candidates; detect a key corresponding to a related key from among remaining ones of the plurality of key candidates supposing that the extracted one of the plurality of key candidates is a main key; on each extracted one of the plurality of key candidates, calculate a related key score in accordance with the number of the key corresponding to the related key; and select a key of the music piece in accordance with the calculated related key score from among the plurality of key candidates.

According to another aspect of the invention, there is provided a program configured to cause a computer to function as the above-described music piece analyzer.

According to still another aspect of the invention, there is provided a music piece analysis method including: analyzing music data to determine a plurality of key candidates; extracting each one of the plurality of key candidates; detecting a key corresponding to a related key from among remaining ones of the plurality of key candidates supposing that the extracted one of the plurality of key candidates is a main key; on each extracted one of the plurality of key candidates, calculating a related key score in accordance with the number of the key corresponding to the related key; and selecting a key of the music piece in accordance with the calculated related key score from among the plurality of key candidates.

According to the above aspects of the invention, a key of a music piece can be more highly accurately and appropriately estimated through a determination using the related key.

BRIEF EXPLANATION OF DRAWINGS

FIG. 2 is an illustration showing an example of a key table.

DESCRIPTION OF EMBODIMENT(S)

Figure 1:
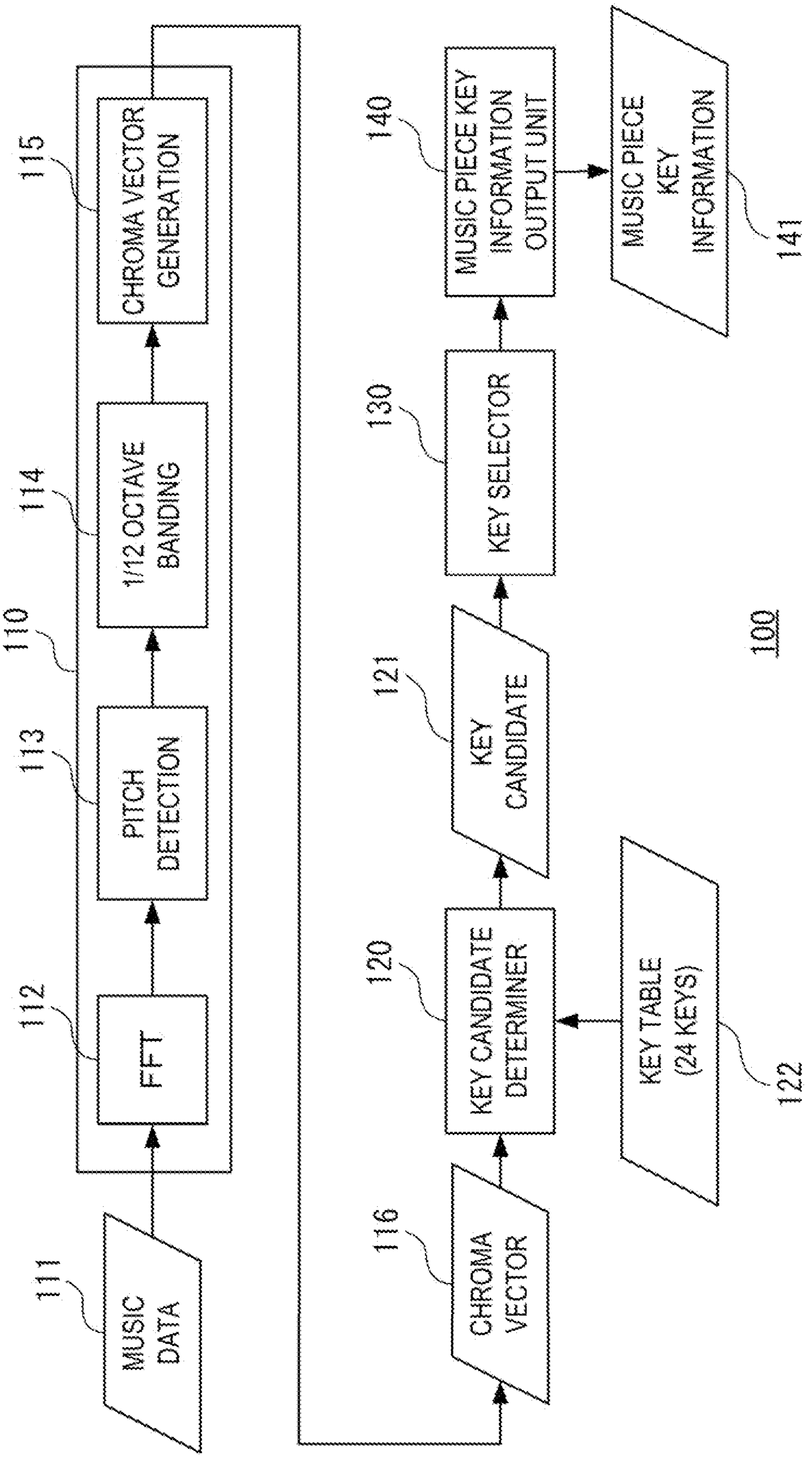
FIG. 1 is a block diagram schematically showing a functional arrangement of a music piece analyzer according to an exemplary embodiment of the invention.

Suitable exemplary embodiments of the invention will be described in detail below with reference to the attached drawings. It should be noted that components of the same or substantially the same function(s) and structure(s) will be denoted by the same reference numerals in the specification and drawings, omitting repetition of description thereof.

FIG. 1 is a block diagram schematically showing a functional arrangement of a music piece analyzer according to an exemplary embodiment of the invention. In the illustrated example, a music piece analyzer 100 includes a chroma vector generator 110, a key candidate determiner 120, a key selector 130, and a music piece key information output unit 140. The music piece analyzer 100, which is implemented by, for instance, a computer including a communication interface, a processor, and a memory, achieves the functions of the chroma vector generator 110, the key candidate determiner 120, the key selector 130, and the music piece key information output unit 140 by the processor working in accordance with a program stored in the memory or received through the communication interface. The functions of the above components will be further described below.

The chroma vector generator 110 is configured to perform frequency analysis processes (specifically, an FFT (Fast Fourier Transform) process 112, a pitch detection process 113, and a 1/12 octave banding process 114) on music data 111 (specifically, PCM (Pulse Code Modulation) data or the like) and perform a chroma vector generation process 115 (specifically, combining the results of the 1/12 octave banding process 114 into one octave of twelve notes and integrating components of the twelve notes in a temporal axis direction to create a chroma vector 116 (audio chroma vector). In the present exemplary embodiment, the chroma vector 116 is composed of twelve factors corresponding to respective appearance frequencies of the twelve notes in the music piece.

The key candidate determiner 120 determines a key candidate 121 based on the chroma vector 116 generated through the above-described analysis of the music data. Specifically, the key candidate determiner 120 is configured to, after normalizing the chroma vector 116 as necessary, determine the key candidate 121 with reference to a key table 122 of total 24 keys as exemplarily shown in FIG. 2. For instance, the key candidate determiner 120 is optionally configured to determine the key candidate 121 in accordance with a candidate score of each of the keys calculated by multiplying the chroma vector 116 by coefficients that are set high at predetermined degree notes of the keys shown in the key table 122 (I degree, III degree, and V degree notes in the illustrated example).

As an example, when a chroma vector $V=(v_A, v_{B\flat}, v_B, v_C, v_{D\flat}, v_D, v_{E\flat}, v_E, v_F, v_{G\flat}, v_G, v_{A\flat})$ is satisfied, a score vector $S=(s_{Amajor}, s_{B\flat major}, s_{Bmajor}, s_{Cmajor}, s_{D\flat major}, s_{Dmajor}, s_{E\flat major}, s_{Emajor}, s_{Fmajor}, s_{G\flat major}, s_{Gmajor}, s_{A\flat major}, s_{Aminor}, s_{B\flat minor}, s_{Bminor}, s_{Cminor}, s_{D\flat minor}, s_{Dminor}, s_{E\flat minor}, s_{Eminor}, s_{Fminor}, s_{G\flat minor}, s_{Gminor}, s_{A\flat minor})$ of each of the keys is calculated by multiplying the chroma vector V by a coefficient matrix M as shown below.

$$S = MV = \begin{bmatrix} k_I & 0 & k_{II} & 0 & k_{III} & k_{IV} & 0 & k_V & 0 & k_{VI} & 0 & k_{VII} \\ k_{VII} & k_I & 0 & k_{II} & 0 & k_{III} & k_{IV} & 0 & k_V & 0 & k_{VI} & 0 \\ 0 & k_{VII} & k_I & 0 & k_{II} & 0 & k_{III} & k_{IV} & 0 & k_V & 0 & k_{VI} \\ \vdots & \vdots & \vdots & \vdots & \vdots & \vdots & \vdots & \vdots & \vdots & \vdots & \vdots & \vdots \\ 0 & k_{II} & k_{III} & 0 & k_{IV} & 0 & k_V & k_{VI} & 0 & k_{VII} & 0 & k_I \end{bmatrix} \begin{bmatrix} v_A \\ v_{Bb} \\ v_B \\ \vdots \\ v_{Ab} \end{bmatrix} \quad \text{Formula 1}$$

The coefficients $k_I, k_{II}, k_{III}, \ldots, k_{VII}$ of the coefficient matrix are determined to correspond to the I to VII degree notes of each of the keys. In music pieces, III and V degree notes of the key are most frequently used next to I degree note, where II, IV, VI, and VII degree notes are less frequently used. Accordingly, the key candidate determiner 120 optionally calculates the candidate score of each of the keys with the coefficients $k_I, k_{II}, k_{III}, \ldots, k_{VII}$ being set at, for instance, $k_I=3$, $k_{III}=k_V=2$, kII=kIV=$k_{VI}=k_{VII}=1$. In another example, instead of multiplying the chroma vector V by the coefficients, the key candidate determiner 120 optionally multiplies the magnitude of elements of the chroma vector V converted into a rank (for instance, 12 for the largest element, 11 for the second largest element, and, in the same manner, 1 for the smallest element) by the coefficients.

After calculating the candidate score of each of the keys, for instance, as described above, the key candidate determiner 120 determines a key whose candidate score is relatively high and/or whose candidate score exceeds a predetermined threshold as the key candidate 121. More specifically, the key candidate determiner 120 optionally determines, for instance, a predetermined number of keys with relatively high candidate scores (e.g. top five keys with high scores) as the key candidate 121. Alternatively, the key candidate determiner 120 optionally determines all of the keys whose candidate score exceeds a threshold or, further alternatively, a predetermined number of key(s) whose candidate score is relatively high exceeding a threshold as the key candidate 121. It should be noted that the key candidate determiner 120, which is configured to determine a plurality of key candidates 121, optionally determines a single key candidate 121 when, for instance, there is a large difference between one of the candidate scores and other candidate scores.

Figure 3:
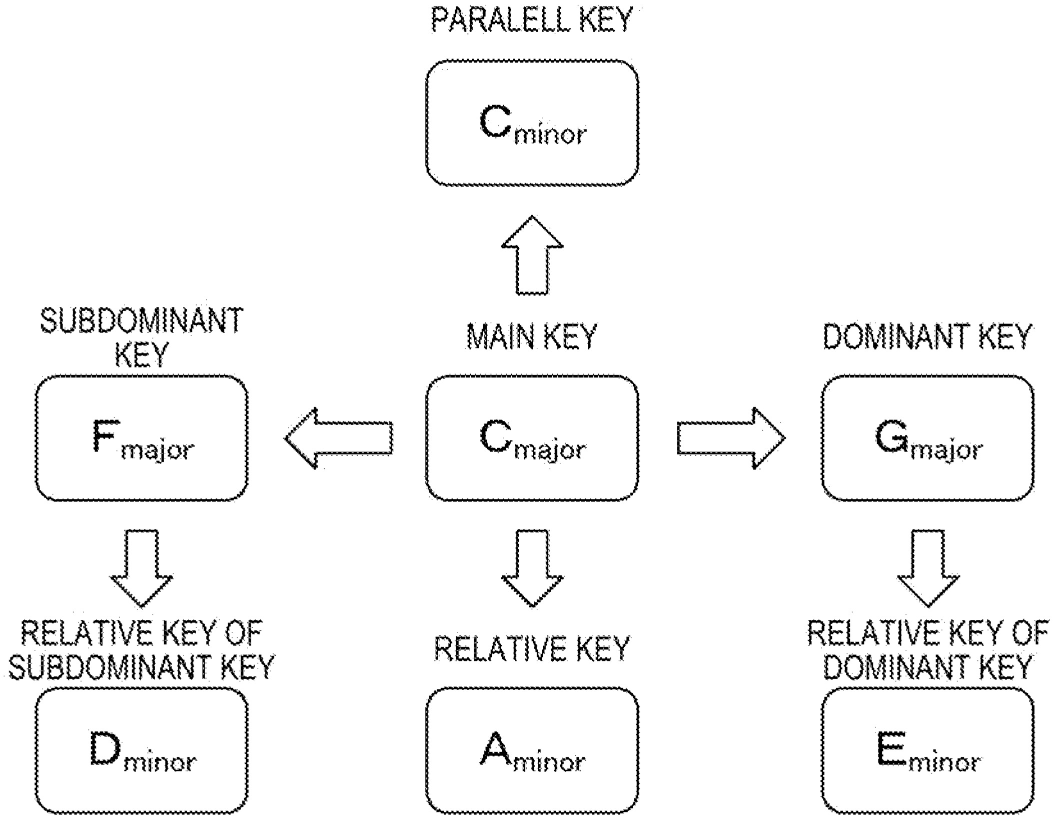
FIG. 3 is an illustration showing an example of a relationship between related keys.

The key selector 130 is configured to perform a related key determination as described below on the plurality of key candidates 121 determined by the key candidate determiner 120 to select the key of the music piece. The selected key of the music piece is outputted as music piece key information 141 by the music piece key information output unit 140. The related key determination is made, for instance, based on a relationship between the related keys as shown in FIG. 3. It is known that, in the illustrated example, the related keys of a main key ($C_{major}$) are a parallel key ($C_{minor}$) with the same tonic (I degree note), a dominant key ($G_{major}$) whose tonic is a perfect fifth above the tonic of the main key, a subdominant key ($F_{major}$) whose tonic is a perfect fifth below the tonic of the main key, and relative keys ($A_{minor}$, $E_{minor}$, and $D_{minor}$) respectively composed of the same notes as the main key, the dominant key, and the subdominant key but of different tonics. It is known that the related keys share many common notes and are closely related to the main key. The key selector 130 optionally determines all of the above dominant key, subdominant key, parallel key, and relative keys or, alternatively, a part of the related keys that are especially closely related to the main key (specifically, for instance, the dominant key, the subdominant key, and the parallel key) to be the related keys.

More specifically, the key selector 130 is configured to: extract each one of the plurality of key candidates determined by the key candidate determiner 120; detect keys corresponding to the related keys from among remaining keys of the plurality of key candidates supposing that the extracted one of the plurality of key candidates is a main key; on each extracted one of the plurality of key candidates, calculate a related key score in accordance with the number of keys corresponding to the related keys; and select the key of the music piece in accordance with the related key score from among the plurality of key candidates. For instance, when the key candidate determiner 120 determines that five keys $\{C_{major}, C_{minor}, G_{major}, F_{major}, A_{minor}\}$ are the key candidates, the key selector 130 detects the key(s) corresponding to the related keys from among remaining keys of the key candidates for each of the five instances (i.e. (i) when the main key is $C_{major}$, (ii) when the main key is $C_{minor}$, (iii) when the main key is $G_{major}$, (iv) when the main key is $F_{major}$, and (v) when the main key is $A_{minor}$). When the number of the key(s) corresponding to the related key(s) is represented by n, n=4 is satisfied in the case of (i) (all of the remaining key candidates correspond to the related keys as shown in the example shown in FIG. 3), n=1 in the case of (ii), n=2 in the cases of (iii) and (iv), and n=3 in the case of (v).

In the above example, the key selector 130 is optionally configured to use the number n directly as the related key score and select a key with the largest n (the main key in the case of (i), i.e. $C_{major}$) as the key of the music piece. Alternatively, the key selector 130 is optionally configured to calculate the related key score so that the related key score becomes relatively high when a specific type of the related key is included. For instance, the key selector 130 is optionally configured to sum the scores that are weighted for each type of the keys corresponding to the related keys detected from among the remaining keys of the candidate keys (e.g. 3 points when the key is the parallel key, 2 points when the key is the dominant key or the subdominant key, 1 point when the key is the relative key) to calculate the related key score.

It should be noted that, when the key candidate determiner 120 determines a single key candidate, the process to be performed by the key selector 130 is not performed but the identified key candidate is directly selected as the key of the music piece. In contrast, when the key candidate determiner 120 determines two key candidates, the related key score becomes the same in either key candidates determined as the main key. In this case and a case with three or more determined key candidates of the same related key score, the key selector 130 is optionally configured to select, for instance, one of the keys whose candidate score calculated by the key candidate determiner 120 is relatively high as the key of the music piece.

The music piece key information output unit 140 outputs the music piece key information 141 for presentation to a user, for instance, by showing the music piece key information on a display. Alternatively, the music piece key information output unit 140 is optionally configured to output the music piece key information 141, for instance, to be recorded in association with the music piece in a form of metadata of the music data 111. With the use of the music piece key information 141 recorded in association with the music piece, for instance, the key of the music piece can be presented to a user when the music piece is to be played using the music data 111. Alternatively, when a DJ machine is used to combine music pieces to make a mix, the music piece to be a candidate(s) for the mix is optionally automatically presented to a user based on the music piece key information 141 recorded in association with the music piece.

In the present exemplary embodiment, the key of a music piece can be highly accurately and appropriately estimated through the determination of the related key. Accordingly, for instance, when a mix is to be prepared with use of a DJ machine as in the above example, an accurate key of the music piece can be presented to a user or a music piece to be a candidate can be automatically presented to a user based on the accurate key of the music piece, thereby allowing preparation of a high-quality mix. The estimation of the accurate key of a music piece is also of great use in the other applications (specifically, in karaoke, creation of a music piece and the like).

Figure 4:
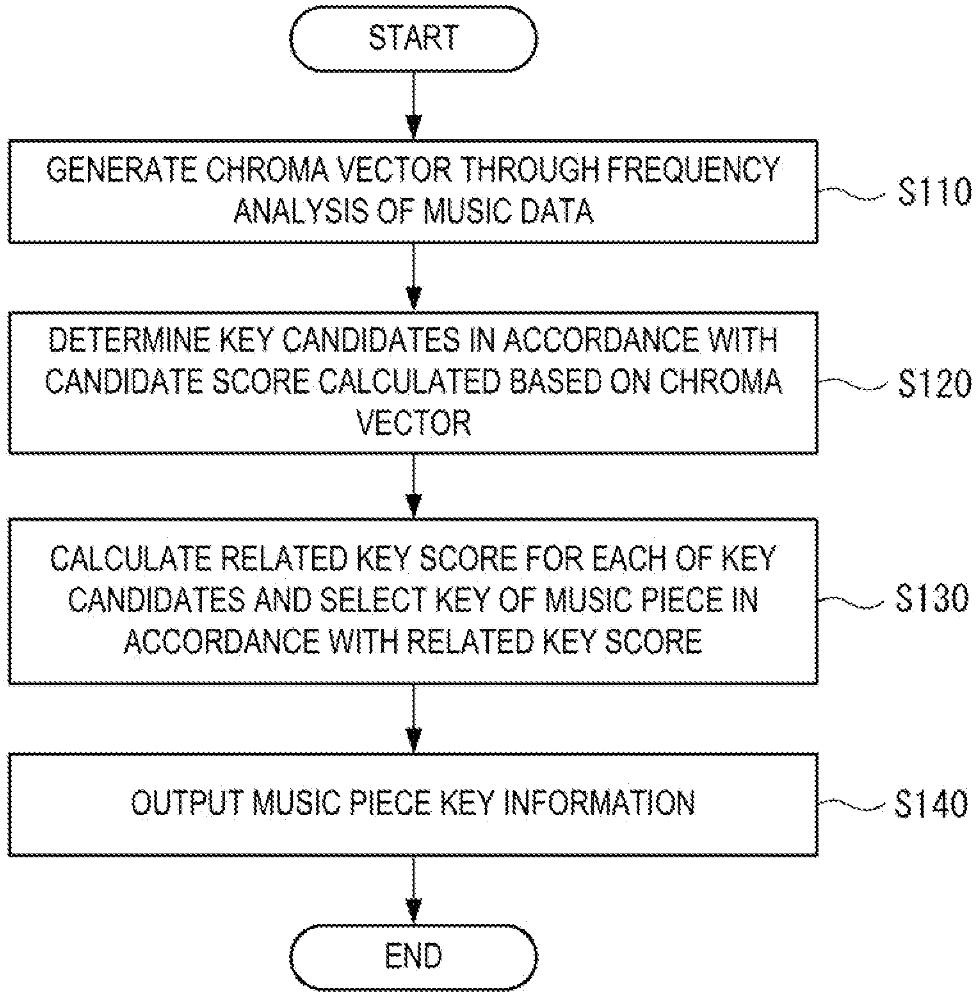
FIG. 4 is a flowchart showing an example of steps in a music piece analysis method according to the exemplary embodiment of the invention.

FIG. 4 is a flowchart showing an example of steps in a music piece analysis method according to the exemplary embodiment of the invention. The illustrated steps are performed by, for instance, the above-described music piece analyzer 100. Initially, the chroma vector generator 110 generates the chroma vector 116 through frequency analysis of the music data (step S110). Subsequently, the key candidate determiner 120 determines a plurality of key candidates in accordance with the candidate score calculated based on the chroma vector 116 (step S120). Further, the key selector 130 calculates the above-described related key score for each of the plurality of key candidates and selects the key of the music piece from among the plurality of key candidates in accordance with the related key score (step S130). Then, the music piece key information output unit 140 presents the music piece key information 141 to a user or outputs the music piece key information 141 to be recorded in association with the music data 111 (step S140).

Suitable exemplary embodiments of the invention have been detailed above with reference to the attached drawings. However, the scope of the invention is not limited by the exemplary embodiment. It would be obvious for those skilled in the art to which the invention pertains that various modifications and revisions are conceivable within the technical idea described within claims, and it is understood that such modifications and revisions are naturally within the technical scope of the invention.

The invention claimed is:

1. A music piece analyzer comprising:
- a key candidate determiner configured to analyze music data to determine key candidates; and
- a key selector configured to:
  - extract each one of the key candidates as an extracted key candidate;
  - for each of the key candidates as the extracted key candidate, detect, from among the key candidates other than the extracted key candidate, those key candidates that are related keys supposing that the extracted key candidate is a main key, and calculate a related key score in accordance with a number of key candidates that are detected as related keys; and
  - select a key of the music piece from among the key candidates in accordance with the related key score calculated for each of the key candidates.

2. The music piece analyzer according to claim 1, wherein the key selector determines a part or all of a dominant key, a subdominant key, a parallel key, and a relative key to be related keys.

3. The music piece analyzer according to claim 2, wherein the key selector is configured to calculate the related key score by summing scores of the related keys, the scores being weighted for each type of the related keys.

4. The music piece analyzer according to claim 1, wherein the key candidate determiner is configured to:
- multiply an audio chroma vector generated through a frequency analysis of the music data by a coefficient set high at a predetermined degree of note of each of the keys to calculate a candidate score of each of the keys; and
- determine the key candidates in accordance with the candidate score.

5. The music piece analyzer according to claim 4, wherein, when there are a plurality of keys of the same related key score in the key candidates, the key selector is configured to select one of the plurality of keys of the same related key score whose candidate score is relatively high as the key of the music piece.

6. The music piece analyzer according to claim 1, further comprising a music piece key information output unit configured to present music piece key information indicating the key of the music piece to a user or output the music piece key information to be recorded in association with the music data.

7. A non-transitory tangible recording medium recording a program configured to cause a computer to function as the music piece analyzer according to claim 1.

8. A music piece analysis method comprising:
- analyzing music data to determine key candidates;
- extracting each one of the key candidates as an extracted key candidate;
- for each of the key candidates as the extracted key candidate, detecting a related key from among the key candidates other than the extracted key candidate, those key candidates that are related keys supposing that the extracted key candidate is a main key, and calculating a related key score in accordance with a number of the key candidates that are detected as related key; and selecting a key of the music piece from among the key candidates in accordance with the related key score calculated for each of the key candidates.

* * * * *